US007698380B1

(12) United States Patent
Amidon et al.

(10) Patent No.: US 7,698,380 B1
(45) Date of Patent: Apr. 13, 2010

(54) SYSTEM AND METHOD OF OPTIMIZING SOCIAL NETWORKS AND USER LEVELS BASED ON PRIOR NETWORK INTERACTIONS

(75) Inventors: Christopher Amidon, Apex, NC (US);
Richard Walsh, Raleigh, NC (US);
Alfredo Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 512 days.

(21) Appl. No.: 11/638,922

(22) Filed: Dec. 14, 2006

(51) Int. Cl.
*G06F 15/16* (2006.01)
*G06F 12/00* (2006.01)
(52) U.S. Cl. .................... 709/218; 709/217
(58) Field of Classification Search ............ 709/217, 709/218, 223–229
See application file for complete search history.

(56) References Cited

U.S. PATENT DOCUMENTS

| | | | |
|---|---|---|---|
| 5,220,657 A | 6/1993 | Bly et al. |
| 5,629,980 A | 5/1997 | Stefik et al. |
| 5,884,035 A | 3/1999 | Butman et al. |
| 6,073,138 A | 6/2000 | de l'Etraz et al. |
| 6,088,702 A | 7/2000 | Plantz et al. |
| 6,149,441 A | 11/2000 | Pellegrino et al. |
| 6,314,409 B2 | 11/2001 | Schneck et al. |
| 6,338,086 B1 | 1/2002 | Curtis et al. |
| 6,389,541 B1 | 5/2002 | Patterson |
| 6,421,439 B1 | 7/2002 | Liffick |
| 6,442,693 B1 | 8/2002 | Sandgren et al. |
| 6,480,885 B1 | 11/2002 | Olivier |
| 6,519,629 B2 | 2/2003 | Harvey et al. |
| 6,525,747 B1 | 2/2003 | Bezos |
| 6,594,693 B1 | 7/2003 | Borwankar |
| 6,630,944 B1 | 10/2003 | Kakota et al. |
| 6,651,086 B1 | 11/2003 | Manber et al. |
| 6,748,420 B1 | 6/2004 | Quatrano et al. |

(Continued)

FOREIGN PATENT DOCUMENTS

WO   WO 2005/006152 A2   1/2005

(Continued)

OTHER PUBLICATIONS

No Author, "pidgin," (website), obtained Jul. 13, 2007, 1 page, http://pidgin.im/.

(Continued)

*Primary Examiner*—Zarni Maung
(74) *Attorney, Agent, or Firm*—Withrow & Terranova, PLLC

(57) ABSTRACT

An optimization server with associated databases for use in social networks utilizes previous interactions and other factors and parameters to optimize a user's level in a social network. The optimization server may be configured to proactively and/or reactively optimize a user's level in a social network by selecting previous social network instances, merging data from the selected instances into a single social network data representation, determining the shortest path between originating and recipient nodes in the network, and assigning a default level for the recipient node based on the shortest path. Additional optimization parameters may be applied to increase or decrease the recipient node's default network level (within certain optionally established limits for change). Various parameters that may be utilized to optimize the social network may include, but are not limited to, user parameters, content classification, user classification, distribution history, existing FOAF definitions, and other external data.

19 Claims, 5 Drawing Sheets

U.S. PATENT DOCUMENTS

| | | |
|---|---|---|
| 6,757,517 B2 | 6/2004 | Chang |
| 6,816,906 B1 | 11/2004 | Icken et al. |
| 6,832,245 B1 | 12/2004 | Isaacs et al. |
| 6,957,193 B2 | 10/2005 | Stefik et al. |
| 6,959,290 B2 | 10/2005 | Stefik et al. |
| 6,970,444 B2 | 11/2005 | Chwieseni et al. |
| 6,988,096 B2 | 1/2006 | Gupta et al. |
| 6,988,127 B2 | 1/2006 | Matsuda et al. |
| 6,993,564 B2 | 1/2006 | Whitten, II |
| 7,016,307 B2 | 3/2006 | Vasudev et al. |
| 7,024,391 B2 | 4/2006 | Burich |
| 7,043,644 B2 | 5/2006 | DeBruine |
| 7,047,202 B2 | 5/2006 | Jaipuria et al. |
| 7,047,406 B2 | 5/2006 | Schleicher et al. |
| 7,051,003 B1 | 5/2006 | Kobata et al. |
| 7,058,606 B2 | 6/2006 | Stefik et al. |
| 7,058,897 B2 | 6/2006 | Matsuda |
| 7,065,579 B2 | 6/2006 | Traversat et al. |
| 7,069,308 B2 | 6/2006 | Abrams |
| 7,103,634 B1 | 9/2006 | Ullmann et al. |
| 7,107,317 B2 | 9/2006 | Demsky et al. |
| 7,177,929 B2 * | 2/2007 | Burbeck et al. .............. 709/224 |
| 7,251,689 B2 * | 7/2007 | Wesley ....................... 709/224 |
| 2002/0032634 A1 | 3/2002 | Abrams et al. |
| 2002/0052885 A1 | 5/2002 | Levy |
| 2002/0057284 A1 | 5/2002 | Dalby et al. |
| 2002/0077985 A1 | 6/2002 | Kobata et al. |
| 2002/0091556 A1 | 7/2002 | Fiala et al. |
| 2002/0091667 A1 | 7/2002 | Jaipuria et al. |
| 2002/0091975 A1 | 7/2002 | Redlich et al. |
| 2002/0116466 A1 | 8/2002 | Trevithick et al. |
| 2002/0124053 A1 | 9/2002 | Adams et al. |
| 2002/0169737 A1 | 11/2002 | Armstrong et al. |
| 2002/0178164 A1 | 11/2002 | Wisniewski |
| 2002/0184357 A1 | 12/2002 | Traversat et al. |
| 2003/0009423 A1 | 1/2003 | Wang et al. |
| 2003/0014482 A1 | 1/2003 | Toyota et al. |
| 2003/0018582 A1 | 1/2003 | Yaacovi |
| 2003/0028596 A1 | 2/2003 | Toyota et al. |
| 2003/0028639 A1 | 2/2003 | Yamamoto et al. |
| 2003/0050976 A1 | 3/2003 | Block et al. |
| 2003/0050977 A1 | 3/2003 | Puthenkulam et al. |
| 2003/0055898 A1 | 3/2003 | Yeager et al. |
| 2003/0061287 A1 | 3/2003 | Yu et al. |
| 2003/0079120 A1 | 4/2003 | Hearn et al. |
| 2003/0135576 A1 | 7/2003 | Bodin |
| 2003/0167324 A1 | 9/2003 | Farnham et al. |
| 2003/0171941 A1 | 9/2003 | Kraenzel et al. |
| 2003/0172034 A1 | 9/2003 | Schneck et al. |
| 2003/0195851 A1 | 10/2003 | Ong |
| 2003/0195924 A1 | 10/2003 | Franke et al. |
| 2003/0204605 A1 | 10/2003 | Hudson et al. |
| 2003/0220975 A1 | 11/2003 | Malik |
| 2003/0220980 A1 | 11/2003 | Crane |
| 2004/0015553 A1 | 1/2004 | Griffin et al. |
| 2004/0024892 A1 | 2/2004 | Creswell et al. |
| 2004/0044774 A1 | 3/2004 | Mangalik et al. |
| 2004/0054723 A1 | 3/2004 | Dayal et al. |
| 2004/0064416 A1 | 4/2004 | Peled et al. |
| 2004/0088325 A1 | 5/2004 | Elder et al. |
| 2004/0103044 A1 | 5/2004 | Vandewater et al. |
| 2004/0122822 A1 | 6/2004 | Thompson et al. |
| 2004/0122855 A1 | 6/2004 | Ruvolo et al. |
| 2004/0137882 A1 | 7/2004 | Forsyth |
| 2004/0148275 A1 | 7/2004 | Achlioptas |
| 2004/0148503 A1 | 7/2004 | Sidman |
| 2004/0148523 A1 | 7/2004 | Lambert |
| 2004/0162871 A1 | 8/2004 | Pabla et al. |
| 2004/0181487 A1 | 9/2004 | Hanson |
| 2004/0193680 A1 | 9/2004 | Gibbs et al. |
| 2004/0205358 A1 | 10/2004 | Erickson |
| 2004/0210535 A1 | 10/2004 | Erickson |
| 2004/0215793 A1 | 10/2004 | Ryan et al. |
| 2004/0220957 A1 * | 11/2004 | McDonough ............... 707/102 |
| 2004/0237045 A1 | 11/2004 | Meltzer |
| 2004/0249768 A1 | 12/2004 | Kontio et al. |
| 2004/0260968 A1 * | 12/2004 | Edwards et al. ................ 714/4 |
| 2004/0267625 A1 | 12/2004 | Feng et al. |
| 2005/0015357 A1 | 1/2005 | Shahidi |
| 2005/0021750 A1 | 1/2005 | Abrams |
| 2005/0031096 A1 | 2/2005 | Postrel |
| 2005/0044361 A1 | 2/2005 | Chang et al. |
| 2005/0044411 A1 | 2/2005 | Somin et al. |
| 2005/0091289 A1 | 4/2005 | Shappell et al. |
| 2005/0091316 A1 | 4/2005 | Ponce et al. |
| 2005/0097170 A1 | 5/2005 | Zhu et al. |
| 2005/0114672 A1 | 5/2005 | Duncan et al. |
| 2005/0114783 A1 | 5/2005 | Szeto |
| 2005/0138430 A1 | 6/2005 | Landsman |
| 2005/0149621 A1 | 7/2005 | Kirkland et al. |
| 2005/0159970 A1 | 7/2005 | Buyukkokten et al. |
| 2005/0159998 A1 | 7/2005 | Buyukkokten et al. |
| 2005/0165726 A1 | 7/2005 | Kawell, Jr. et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0172001 A1 | 8/2005 | Zauer et al. |
| 2005/0172116 A1 | 8/2005 | Burch et al. |
| 2005/0177385 A1 | 8/2005 | Hull et al. |
| 2005/0177614 A1 | 8/2005 | Bourne |
| 2005/0188108 A1 * | 8/2005 | Carter et al. ................ 709/239 |
| 2005/0193054 A1 | 9/2005 | Wilson et al. |
| 2005/0195978 A1 | 9/2005 | Babic et al. |
| 2005/0197846 A1 | 9/2005 | Pezaris et al. |
| 2005/0198031 A1 | 9/2005 | Pezaris et al. |
| 2005/0198131 A1 | 9/2005 | Appelman et al. |
| 2005/0198172 A1 | 9/2005 | Appelman et al. |
| 2005/0198305 A1 | 9/2005 | Pezaris et al. |
| 2005/0201290 A1 | 9/2005 | Vasudev et al. |
| 2005/0203801 A1 | 9/2005 | Morgenstern et al. |
| 2005/0204038 A1 | 9/2005 | Medvinsky et al. |
| 2005/0210104 A1 | 9/2005 | Turvinen |
| 2005/0210409 A1 | 9/2005 | Jou |
| 2005/0215660 A1 | 9/2005 | Tumikawa et al. |
| 2005/0216300 A1 | 9/2005 | Appelman et al. |
| 2005/0229243 A1 | 10/2005 | Svendsen et al. |
| 2005/0232423 A1 | 10/2005 | Horvitz et al. |
| 2005/0234864 A1 | 10/2005 | Shapiro |
| 2005/0235062 A1 | 10/2005 | Lunt et al. |
| 2005/0240773 A1 | 10/2005 | Hilbert et al. |
| 2005/0243736 A1 | 11/2005 | Faloutsos et al. |
| 2005/0246420 A1 | 11/2005 | Little, II |
| 2005/0251553 A1 | 11/2005 | Gottfried |
| 2005/0256866 A1 | 11/2005 | Lu et al. |
| 2005/0256909 A1 | 11/2005 | Aboulhosn et al. |
| 2005/0262199 A1 | 11/2005 | Chen et al. |
| 2005/0262530 A1 | 11/2005 | Ruetschi et al. |
| 2005/0266835 A1 | 12/2005 | Agrawal et al. |
| 2005/0267766 A1 | 12/2005 | Galbreath et al. |
| 2005/0267940 A1 | 12/2005 | Galbreath et al. |
| 2005/0283497 A1 | 12/2005 | Nurminen et al. |
| 2005/0289648 A1 | 12/2005 | Grobman et al. |
| 2006/0004789 A1 | 1/2006 | Lunt et al. |
| 2006/0004892 A1 | 1/2006 | Lunt et al. |
| 2006/0010225 A1 | 1/2006 | Issa |
| 2006/0015588 A1 | 1/2006 | Achlioptas et al. |
| 2006/0020960 A1 | 1/2006 | Relan et al. |
| 2006/0021009 A1 | 1/2006 | Lunt |
| 2006/0026235 A1 | 2/2006 | Schwarz et al. |
| 2006/0031489 A1 | 2/2006 | Marcjan |
| 2006/0035766 A1 | 2/2006 | Towley, III et al. |
| 2006/0036641 A1 | 2/2006 | Brydon et al. |
| 2006/0048059 A1 | 3/2006 | Etkin |

| | | | |
|---|---|---|---|
| 2006/0053380 A1 | 3/2006 | Spataro et al. |
| 2006/0064431 A1 | 3/2006 | Kishore et al. |
| 2006/0085248 A1 | 4/2006 | Armen et al. |
| 2006/0089913 A1 | 4/2006 | Jaipuria et al. |
| 2006/0090137 A1 | 4/2006 | Cheng et al. |
| 2006/0095471 A1 | 5/2006 | Krikorian et al. |
| 2006/0095514 A1 | 5/2006 | Wang et al. |
| 2006/0095976 A1 | 5/2006 | Torres et al. |
| 2006/0107286 A1 | 5/2006 | Connor et al. |
| 2006/0117098 A1 | 6/2006 | Schellingerhout et al. |
| 2006/0117378 A1 | 6/2006 | Tam et al. |
| 2006/0121988 A1 | 6/2006 | Reville et al. |
| 2006/0123127 A1 | 6/2006 | Littlefield |
| 2006/0136419 A1 | 6/2006 | Brydon et al. |
| 2006/0136551 A1 | 6/2006 | Amidon et al. |
| 2006/0143068 A1 | 6/2006 | Calabria |
| 2006/0143183 A1 | 6/2006 | Goldberg et al. |
| 2006/0143236 A1 | 6/2006 | Wu |
| 2006/0146765 A1 | 7/2006 | Van De Sluis et al. |
| 2006/0155813 A1 | 7/2006 | Dietz et al. |
| 2006/0167804 A1 | 7/2006 | Aydar et al. |
| 2006/0173838 A1 | 8/2006 | Garg et al. |
| 2006/0173957 A1 | 8/2006 | Robinson et al. |
| 2006/0173963 A1 | 8/2006 | Roseway et al. |
| 2006/0184617 A1 | 8/2006 | Nicholas et al. |
| 2006/0184997 A1 | 8/2006 | La Rotonda et al. |
| 2006/0190536 A1 | 8/2006 | Strong et al. |
| 2006/0195462 A1 | 8/2006 | Rogers |
| 2006/0200434 A1 | 9/2006 | Flinn et al. |
| 2006/0200435 A1 | 9/2006 | Flinn et al. |
| 2006/0209727 A1 | 9/2006 | Jennings, III et al. |
| 2006/0218153 A1 | 9/2006 | Voon et al. |
| 2006/0218225 A1 | 9/2006 | Hee Voon et al. |
| 2006/0218577 A1 | 9/2006 | Goodman et al. |
| 2006/0230061 A1 | 10/2006 | Sample et al. |
| 2006/0248122 A1 | 11/2006 | Nikiel et al. |
| 2006/0248573 A1 | 11/2006 | Pannu et al. |
| 2006/0259957 A1 | 11/2006 | Tam et al. |
| 2006/0259982 A1 | 11/2006 | Upendran |
| 2006/0267940 A1 | 11/2006 | Groom et al. |
| 2007/0061487 A1 | 3/2007 | Moore et al. |
| 2007/0150603 A1 | 6/2007 | Crull et al. |
| 2007/0192299 A1 | 8/2007 | Zuckerberg et al. |
| 2007/0255785 A1 | 11/2007 | Hayashi et al. |

FOREIGN PATENT DOCUMENTS

| | | |
|---|---|---|
| WO | WO 2005/111760 A1 | 11/2005 |
| WO | WO 2007/070676 A2 | 6/2007 |

OTHER PUBLICATIONS

No Author, "Architecture of Windows Media Rights Manager," (website), obtained Oct. 25, 2006, 5 pages, www.microsoft.com/windows/windowsmedia/howto/articles/drmarchitecture.aspx.
No Author, "Dijkstra's algorithm," (website), obtained Apr. 10, 2008, 4 pages, http://en.wikipedia.org/wiki/Dijkstra's_algorithm.
No Author, "News—Gaim 1.5.0," (website), obtained Sep. 6, 2007, 3 pages, http://www.gaim.sourceforge.net.
Unpublished U.S. Appl. No. 11/516,231, filed Sep. 6, 2006.
Unpublished U.S. Appl. No. 11/516,294, filed Sep. 6, 2006.
Unpublished U.S. Appl. No. 11/528,155, filed Sep. 27, 2006.
Unpublished U.S. Appl. No. 11/526,955, filed Sep. 26, 2006.
Unpublished U.S. Appl. No. 11/639,570, filed Dec. 15, 2006.
Unpublished U.S. Appl. No. 11/639,104, filed Dec. 14, 2006.
Home page for www.myspace.com.
Home page for www.facebook.com.
Home page for www.friendster.com.
Home page for www.foaf-project.org.
Home page for ICQ.com.
Home page for www.huminity.com/English/software.html.

* cited by examiner

SYSTEM AND METHOD OF OPTIMIZING SOCIAL NETWORKS AND USER LEVELS BASED ON PRIOR NETWORK INTERACTIONS

FIELD OF THE INVENTION

The present invention generally relates to communication and controlled sharing of digital content among networked users, and is more particularly concerned with features and steps for creating an optimized social network and associated user levels based on previous network interactions.

BACKGROUND OF THE INVENTION

The increased availability of network-capable computing devices has led to a wide variety of communication options for users. Users can exchange messages and content through various communication systems including e-mail, instant messaging, chat rooms, bulletin and discussion boards, file sharing applications, and blogs and other web sites. For example, instant messaging systems such as Internet Relay Chat (IRC), ICQ, AOL Instant Messenger, Yahoo! Messenger, and Microsoft's MSN Messenger are widely used by many users on the Internet. Similar systems are available for messaging within local networks, as well.

Various arrangements of the previously-listed (and other) communication systems have been proposed for use in so-called "social networking" systems. Generally speaking, a "social network" refers to a group of persons or other entities ("members") linked to one another through one or more types of social connections. Social networks are also commonly referred to as "friend-of-a-friend" networks, although social networks may of course include or consist entirely of entities linked by social connections other than friendship. For example, a social network can include members linked to one another by connections including common friendship, place or field of employment, place of education, place of residence, membership in a club or other group, or common hobbies or topical interests. Many social networking systems attempt to provide computer-based tools for maintaining, enhancing, and creating social networks.

For example, social networking web sites provide users with web space to create a profile and link to various other users designated as "friends." See, for example, http://www.myspace.com, http://www.facebook.com, and http://www.friendster.com. Users of such sites can post messages and other content to web pages accessible to various parties of their choosing (for example, to "friends only" or to the public at large). Social networking sites may also utilize instant messaging and online chat rooms that allow for near-instantaneous communication between users.

Social networks and the interactions thereof may develop from a variety of different systems for establishing, modeling, and/or managing the social network relationships and corresponding infrastructure. In one particular example, social networks can be created for providing "limited viral distribution" of digital content among a plurality of invited users. A content provider may limit the extent to which selected digital content may be shared by establishing a "degree of separation", or maximum level distance from a content provider the content can be distributed through a sharing network. In this example, a user wants to seed digital content to a select group of people and allow them to have freedom to spread the content further, at their discretion, and to users of their choice. However, certain controls on the social distribution network are established to prevent the content from going to the general public. The networked relationship that is created by sharing content from the originating user to other invited members creates a social network for purposes of sharing content in a limited and controlled fashion. Additional details regarding this particular type of social network and associated content sharing features is disclosed in U.S. patent application Ser. No. 11/516,231, entitled "SYSTEM AND METHOD FOR RIGHTS PROPAGATION AND LICENSE MANAGEMENT IN CONJUNCTION WITH DISTRIBUTION OF DIGITAL CONTENT IN A SOCIAL NETWORK", filed on Sep. 6, 2006, currently pending, which is hereby incorporated by reference in its entirety for all purposes.

Potential concerns may arise when a user's place (or level) in a given social network instance is not the optimal representation of the true or desired social network level. This situation may occur, for example, when a given user is connected in the social network by more than one path from an originating user, or content owner. In one exemplary situation, a user may be considered by one path to be two levels away from an originating user, but four levels away by another path. Often times having a greater separational distance (higher level number) in the social network will limit that user's functionality, influence or other features provided by the social network system.

In response to this potential limitation, a need exists for technology that optimizes a social network. In accordance with the presently disclosed technology, a social network optimization server utilizes previous network interactions, including social network instances, user parameters, content classification, user classification, distribution history, existing social network distributions, and other external data to optimize a social network. Based on user preferences, the system merges selected social network interactions into a single social network and then finds the optimal (shortest) path to the user to determine that user's level in the network. The system further optimizes the user's level by utilizing other influences such as user classification and previous distribution history of related content. The end result is that for current content distribution or other interaction, each user in the social network can be assured to obtain the highest level in the social network possible. This, in turn, gives the user the highest level of access, or other functional features provided via the social network.

Although various social networking technologies exist, no solution that addresses all the features and aspects of the present subject matter has been developed.

SUMMARY OF THE INVENTION

Objects and advantages of the invention will be set forth in part in the following description, or may be obvious from the description, or may be learned through practice of the invention.

One advantage achieved in some embodiments of the present technology is increased flexibility in content sharing among a social network. In one embodiment, users in a social network are able to optimize their position in the social network, thus providing a user with higher levels of content access, increased modification functionality, or other types of system functionality. Such advantage may be achieved in part because of an optimization server that calculates the level distance between any two sharing nodes in a social network. In one embodiment, an optimization server functions as a centralized nodal element that employs prior content distribution history to determine a collection of social network instances associated with a given node in the network. By using this collection of historical data, the optimization node can find the shortest path from the given node to other nodes in the social network, thus optimizing the given node's level of access, functionality or other network provisions.

One exemplary embodiment of the presently disclosed technology concerns an improved server for use in social networks that utilizes previous interactions and other factors and parameters to optimize a user's level in a social network. Such an optimization server may be provided along with at least one historical database and at least one optimization database as part of an optimization node for client-based interaction. The optimization server may be configured to optimize a user's level in a social network by selecting previous social network instances, merging data from the selected instances into a single social network data representation, determining the shortest path between originating and recipient nodes in the network, and assigning a default level for the recipient node based on the shortest path. Additional optimization parameters may be applied to increase or decrease the recipient node's default network level (within certain optionally established limits for change). Various parameters that may be utilized to optimize the social network may include, but are not limited to, user parameters, content classification, user classification, distribution history, existing FOAF definitions, and other external data. Social network optimization may occur proactively and/or reactively as content is selected for sharing in the social network. Unique graphs of past distributions and recommendations for future distributions may also be created using the subject optimization technology.

Other features and aspects of the present invention are discussed in greater detail below.

BRIEF DESCRIPTION OF THE SEVERAL VIEWS OF THE DRAWINGS

The foregoing and other features, aspects and advantages of the present invention will become better understood with regard to the following description, appended claims and accompanying drawings where:

Use of like reference numerals in different features is intended to illustrate like or analogous components.

DETAILED DESCRIPTION OF THE PREFERRED EMBODIMENTS

The invention will now be described in detail with reference to particular embodiments thereof. The embodiments are provided by way of explanation of the invention, and are not meant as a limitation of the invention. It will be apparent to those skilled in the art that various modifications and variations can be made in the present invention without departing from the scope and spirit of the invention. For example, features described or illustrated as part of one embodiment may be used with another embodiment to yield a still further embodiment. Thus, it is intended that the present invention include these and other modifications and variations as come within the scope and spirit of the invention, including the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer.

The present disclosure also makes reference to the relay of communicated data over a network such as the Internet. It should be appreciated that such network communications may also occur over alternative networks such as a dial-in network, a local area network (LAN), wide area network (WAN), public switched telephone network (PSTN), the Internet, intranet or Ethernet type networks and others over any combination of hard-wired or wireless communication links.

The various computer systems discussed herein are not limited to any particular hardware architecture or configuration. Any suitable programming, scripting, or other type of language or combinations of languages may be used to implement the teachings contained herein.

Figure 1:
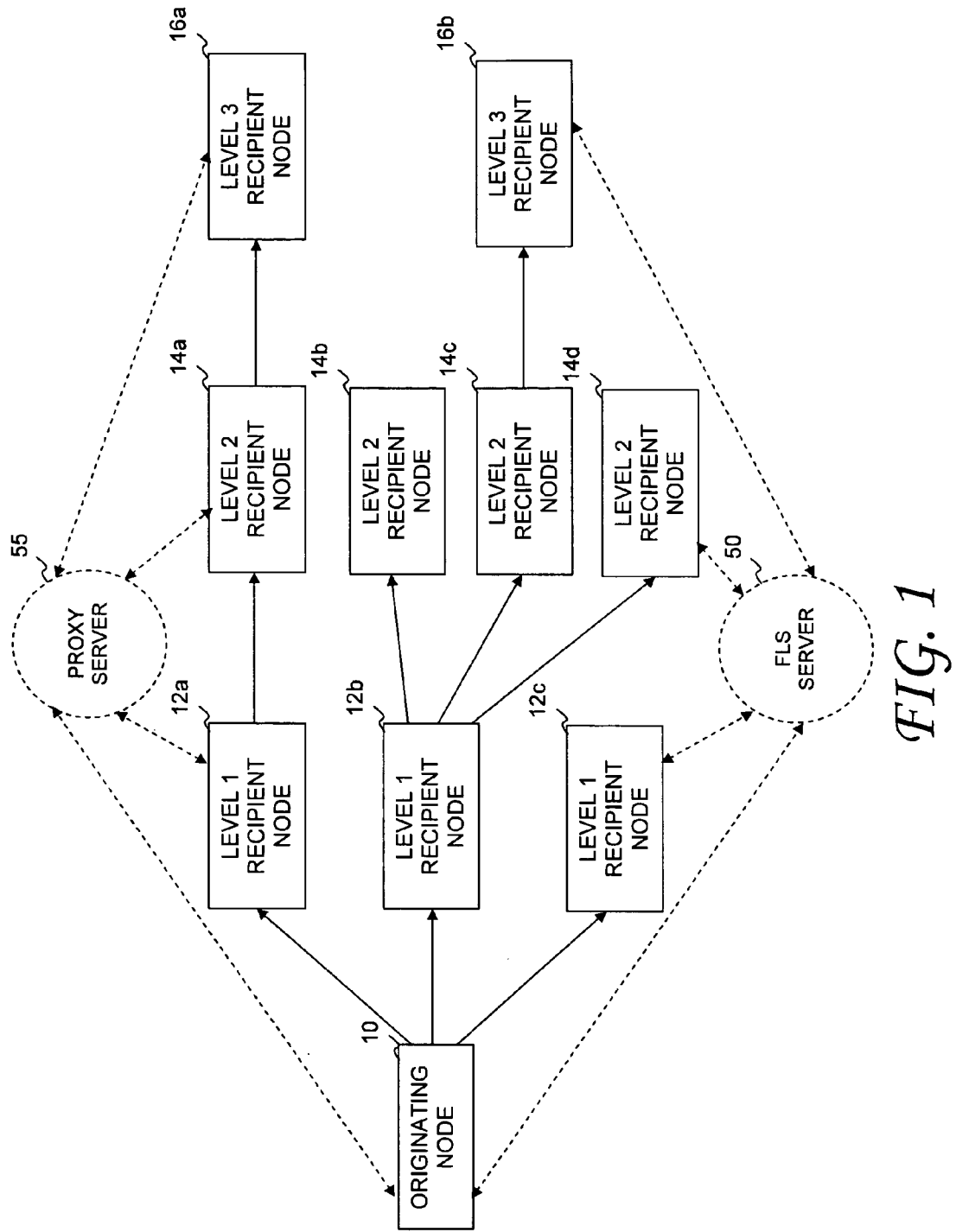
FIG. 1 provides a block diagram representation of an exemplary network interaction among multiple clients, a license server and a proxy server in a social network.

With more particular reference to a first example of a social network with which the features and steps of the presently disclosed technology may be integrated, FIG. 1 illustrates an exemplary social network of users sharing digital content in accordance with certain controls on distribution. Users are designated generally in FIG. 1 as nodes, although it should be appreciated that more specific representations such as clients, peers, or the like may be employed in other embodiments. An originating node 10 identifies digital content that is to be shared with other nodes in a network. It should be appreciated that users of the disclosed technology, including originating node 10 as well as recipient nodes may correspond to individuals, groups of individuals, business entities, etc. and should not be a limiting feature of the present subject matter. In one example, originating and recipient nodes may be embodied by such physical systems as a personal computer (PC), mobile terminal device (e.g., cellular telephone), Personal Digital Assistant, or the like.

Before an originating node actually distributes digital content, certain distribution parameters that establish limitations on how the digital content is to be distributed to one or more recipient nodes must be selected. Distribution parameters can include such information as a level limit representative of the maximum number of "degrees of separation" allowed between the originating node and any recipient node. In the example of FIG. 1, originating node 10 designates a level limit of three levels, which means that the selected digital content can only be distributed up to a maximum of three levels away from the originating node 10.

Distribution parameters can also include an initial distribution list that designates the starting nodes for the social network. In the example of FIG. 1, originating node 10 selects three users in an initial distribution list, corresponding to level one (1) nodes 12a, 12b and 12c. Level one recipients 12a, 12b and 12c are then free to distribute to any entity they wish that is not specifically blocked by the originating node. For example, in accordance with a second level of content distribution as illustrated in FIG. 1, level one recipient 12a may choose to send the selected digital content to level two (2) recipient 14a, while level one recipient 12b may choose to send the digital content to multiple nodes 14b, 14c and 14d and level two recipient 12c does not further distribute the content. In accordance with a third level of content distribution, node 14a decides to forward the digital content to level three (3) recipient 16a, node 14c shares the digital content with level three recipient 16b, and peers 14b and 14d do not share the content with further nodes. Level three recipients 16a and 16b are restricted in this particular example from further distributing the selected digital content since originating node 10 defined a distribution level limit of three.

As observed from the layered communication among networked users depicted in FIG. 1, the entire spectrum of distribution is not defined by the originating node. Instead, the subject content distribution network involves dynamic (or viral) distribution as opposed to a predetermined configuration. Originating node 10 doesn't know if the selected digital content will reach three or three-hundred people, but it will not be distributed beyond three levels deep in the social network. It should be appreciated that the content distribution depicted in FIG. 1 is for exemplary purposes only and many variations are possible in accordance with the disclosed technology. More particularly, each node in a given level n may decide to share with a lesser or greater number of nodes in the next level n+1 than is actually illustrated in FIG. 1.

Additional distribution parameters that are specified by originating node 10 include alteration definitions for one or more of the three allowable levels in the social network. Alteration definitions may define degradation characteristics for the digital content, such as a number of frames per second, file resolution, file size, length, color or bit rate, or other file characterization parameters as will be known or appreciated by one of ordinary skill in the art. Alteration definitions may also define an augmentation file, such as but not limited to a visible or invisible watermark or other hindrance, an advertisement, a portion of text, or a supplemental audio or video segment for appending, prepending or otherwise incorporating into the digital content. Another parameter may correspond to a maximum number of total recipient nodes for overall distribution or for maximum distribution per level. A still further distribution parameter may include one or more relationship types for identifying desirable characteristics or limitations associated with recipient nodes authorized to receive versions of the digital content. In one example, originating node 10 may select a digital video for controlled distribution to recipient nodes and may wish to degrade the quality level of the video as it spreads farther away from the originating node. In one example, level-one nodes 12a, 12b and 12c receive a highest quality video from originating node 10. Level-two recipient nodes 14a, 14b, 14c and 14d receive a medium quality version of video, and level-three nodes 16a and 16b receive a version that is low quality and has advertisements preceding the video playback.

Before originating node 10 is able to share digital content to other nodes in the network of FIG. 1, a desktop application provided on the originating node's computing system generates certain information, including a key ID, which corresponds to a unique identifier for the selected digital content and also a license key seed (LKS). The LKS is a value that is only known by the originating node 10 and a FOAF license server (FLS) 50, and is used to encrypt the digital content. A distribution package including all such information ultimately contains a form of the digital content that has been encrypted and locked with a digital "key". The result is an encrypted file that can only be unlocked by a person who has obtained a license with the required key for decrypting the digital content. Such a license may be received by a recipient node from FLS 50.

In one embodiment of content sharing as effected by the social network of FIG. 1, FLS server 50 is a stand-alone centrally hosted license server (without the involvement of a proxy server 55) that is accessible from the systems of an originating node and recipient nodes. It should be appreciated that although FLS 50 (and proxy server 55) are only depicted in FIG. 1 as being in bi-directional communication via dashed lines with a closest subset of network nodes, such communication is actually provided for each node in the network when those respective servers are utilized. The limited depiction is merely provided for ease of illustration.

When FLS 50 functions as a stand-alone license server without the use of a proxy server 55, FLS 50 is responsible for issuing licenses for each level of recipient nodes in the social network, while the nodes in the peer-to-peer network are responsible for content propagation. In accordance with the DRM model of FIG. 1, originating node 10 only shares a content DRM key with FLS 50, so that FLS 50 can issue licenses. For security reasons, such key is not shared with recipient nodes 12a-12c, 14a-14d, and 16a-16b, or other nodes when available. FLS 50 includes in part a license assignment module that creates licenses for received content in response to an access request from a recipient node. Licenses are created according to the level-rights and distribution parameters defined for the particular node levels associated with the given digital content. A license generated by FLS 50 includes a key that can be used to unlock, or decrypt the content that was previously encrypted by a user's content distribution desktop application. In one embodiment, recipient nodes 12a-12c, 14a-14d, 16a-16b, etc. cannot modify the digital content before forwarding the content downstream to the next level of user(s), if allowed.

In another distribution scenario related to the social network of FIG. 1, an arrangement utilizing a proxy server and hybrid P2P model provides additional efficiencies. When a social network employs FLS server 50 and a proxy server 55 in combination, all previously intra-node communications can flow through proxy server 55. Proxy server 55 brings a capability to manage DRM and content propagation transparently on behalf of originating node 10. Proxy 55 also offloads DRM management by taking over DRM functions on behalf of the originating node automatically as content is introduced into the network. In accordance with the technology disclosed herein, a complete and lossless form of digital content is no longer required to be passed to each recipient node in the social network. In contrast, only the form of digital content which each recipient node is authorized to view is ultimately passed to each requesting recipient peer. In addition, any augmented files which are designated by the originating node for appending, prepending or otherwise integrating with a form of the digital content do not need to be stored at each level in the network. Instead, the video advertisement, graphic or text, or other augmentation file can be extracted from the Internet or fetched from originating node 10 by the proxy server 55 (or other designated generation peer) during a step of generating a rights-managed form of the digital content. By utilizing references and loading the content only when needed, the file size of shared content can be reduced.

Additional description regarding aspects of controlled content distribution as implemented in a social network such as briefly discussed above with reference to FIG. 1 are disclosed in the following currently pending patent applications, co-owned by Qurio Holdings, Inc., which are incorporated by reference in their entirety for all purposes: U.S. patent application Ser. No. 11/516,294 entitled "System and Method for Controlled Viral Distribution of Digital Content in a Social Network", filed Sep. 6, 2006 and U.S. patent application Ser. No. 11/528,155 entitled "System and Method of Using a Proxy Server to Manage Lazy Content Distribution in a Social Network", filed Sep. 27, 2006.

Proceeding with a description of exemplary aspects of the present technology, reference will now be directed to features and steps for providing optimized social network parameters based on ad-hoc social interactions. More particularly, such technology may involve a Social Network Optimization Server which utilizes previous interactions and other factors and parameters to optimize a user's level in a social network. Based on user preferences, the system merges selected social network interactions into a single social network and then finds the optimal (shortest) path between an originating and given recipient user nodes to determine the optimized level for the given recipient node. Such a system may further optimize a user's level by utilizing other influencers such as user classification and previous distribution history of related content. The end result is that for current content distribution, or other interaction, each user in the social network can be assured to obtain the highest level in the social network possible. This, in turn, gives the user the highest level of allowed access and/or highest allowed level of one or more types of system functionality provided by the social network.

The functionality provided by the disclosed optimization technology could be employed by any system dealing with interactions in a social network (i.e., social network instances). As used herein, a social network instance comprises a collection of at least some members of a social network that have previously been or are currently connected by way of one or more communication links for purposes of live communication, content distribution, or other purposes. In one embodiment, a social network instance corresponds to a collection of social network members who were/are participating in a live communication link, such as an ongoing instant messaging conversation between multiple parties. Other exemplary social network instances are defined by the user interaction associated with specific occurrences of one or more file or content sharing sessions, e-mail conversations, blog postings and comments, video and/or audio chat sessions, or other video, textual, and/or audio connections, including telephone connections, and the like.

Such social network instances include, but are not limited to viral content distribution systems such as the one described herein with reference to FIG. 1 and more particularly in previously referenced U.S. patent application Ser. Nos. 11/516,294 and 11/528,155. Such content distribution arrangements for social network communication may be based on hybrid P2P or central server based content sharing sites. This system integrates with DRM systems such as the one described in U.S. patent application Ser. No. 11/528,155 by adjusting the user's level prior to accessing the DRM-specific functionality.

The following description will utilize the content distribution system as described herein and also in the above-referenced co-pending applications as an example system which could utilize this functionality. This example is used for convenience in discussing some of the features of social network optimization, but should not be limited to this example. Social network optimization features may also be employed in social network instances that are established via any form or combination of network-based communication technologies, including but not limited to e-mail, instant messaging (IM), web-based communications, file and content sharing, audio communications including cellular and VoIP telephony, and the like.

An exemplary use case will be discussed with reference to FIG. 2 to illustrate a simple and relatively straightforward use of the subject social network optimization technology. It should be appreciated that although this example represents users in a social network as individual users, the disclosed technology is not limited to use by such entities, but may be expanded to include other types of users including but not limited to business organizations, groups of individual users, etc.

Figure 2:
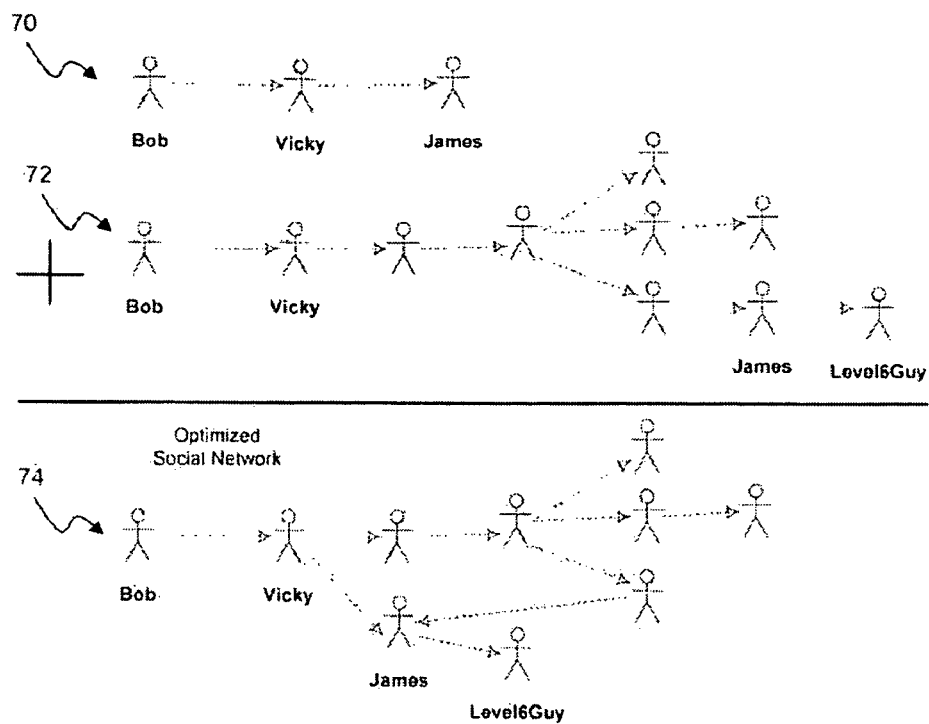
FIG. 2 depicts first and second exemplary social network distribution instances and a merged representation of both such instances as part of creating an optimized social network representation.

Referring to FIG. 2, in a first instance 70 of content distribution, an originating user Bob shares content with another user Vicky who then further distributes the shared content to James. Since James is two levels from the originating user Bob, James is considered a level two user in distribution 70. In second distribution 72, James receives the same or a similar version of the content shared by content owner Bob, except this time as a level five user in the network. In content sharing systems that don't include optimization features as presently disclosed, user James would only have access to the level five version of the shared content. However, by utilizing the historical information associated with first distribution 70, the system can determine that James should actually be a level two for this content—and adjusts the social network accordingly. Once James is recognized as a level two user, Level6Guy depicted in distribution 72 of FIG. 2 may be automatically updated to be a level three user. An optimized social network that may result from combining the distribution information from distributions 70 and 72 is represented as social network 74 in FIG. 2.

Figure 3:
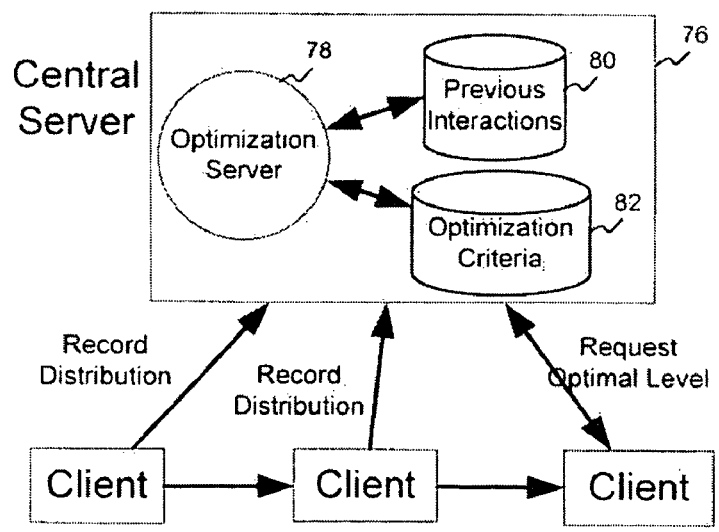
FIG. 3 provides a block diagram representation of an exemplary overall system architecture for social networks employing optimization features.

An example of the overall system architecture that may be used to effectuate social network optimization features as presently disclosed is illustrated in FIG. 3. Optimization features and steps may be provided by a central server 76, which contains the necessary data, rules and logic to automatically create optimized social networks for a given distribution of content or type of system functionality—thus creating optimized levels in the network for requesting users. When the interacting members of a social network, including but not limited to servers, clients, peers and other components are viewed respectively simply as network nodes, central server 76 may be referred to as an optimization node. This central server and other related components illustrated in FIG. 3 may be included as part of other servers such as license server 50 or proxy server 55 as discussed with reference to FIG. 1.

Referring still to FIG. 3, central server 76 preferably includes an optimization server 78 and at least two databases internal or external to central server 76. A first database 80 is configured to store data concerning previous interactions in the social network, while database 82 is configured to store data regarding optimization criteria that may be established as default criteria or that are selected by a user in the network. The optimization server 78 could be used by any system that initiates and tracks social network interactions. For example, as clients distribute content, information about the distribution is sent to the optimization server and stored in database 80. Other data, including preferences, user classification, etc. is stored on the optimization server in one of the databases 80 and 82. It should be appreciated that one or more databases, tables, dedicated memory locations, etc. may be variously used to store the parameter information needed to optimize social networks and user levels as described herein. As such, the dual database configuration illustrated in FIG. 3 is for exemplary purposes only and should not be construed as a limitation of the present subject matter. A client anywhere in the distribution path can make a request to the optimization server 76 to optimize his position in the social network. The optimization server will utilize the data, rules and logic described below in order to determine an optimal social network for the given content, and thus the optimal level in the network for the requesting user.

Figure 4:
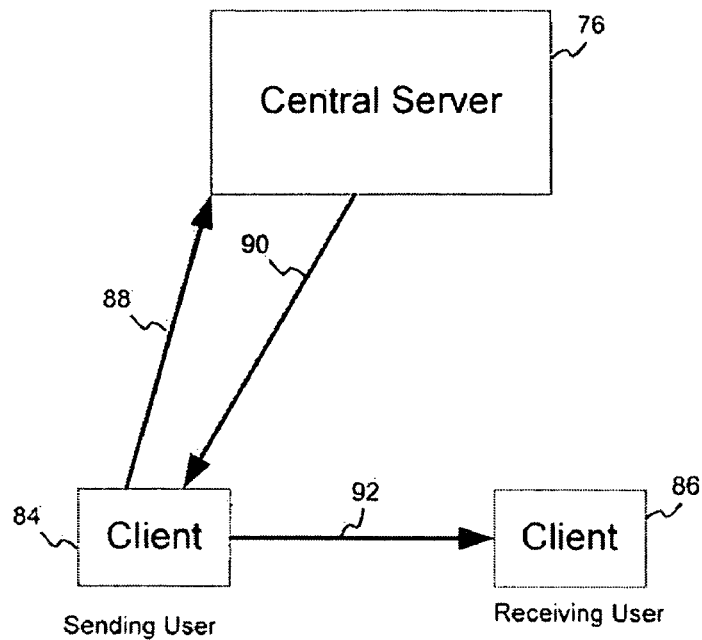
FIG. 4 provides a block diagram with content flow representation for a system and method in which a social network is proactively optimized.
Figure 5:
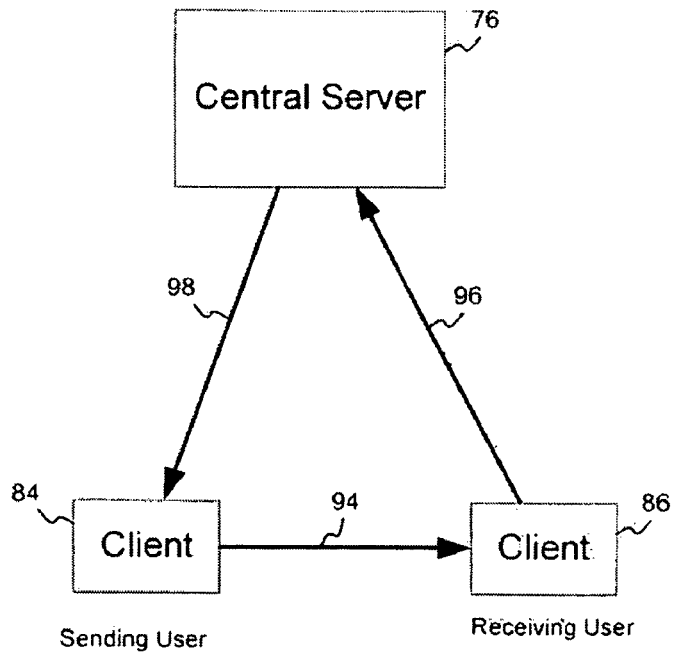
FIG. 5 provides a block diagram with content flow representation for a system and method in which a social network is reactively optimized.
Figure 6:
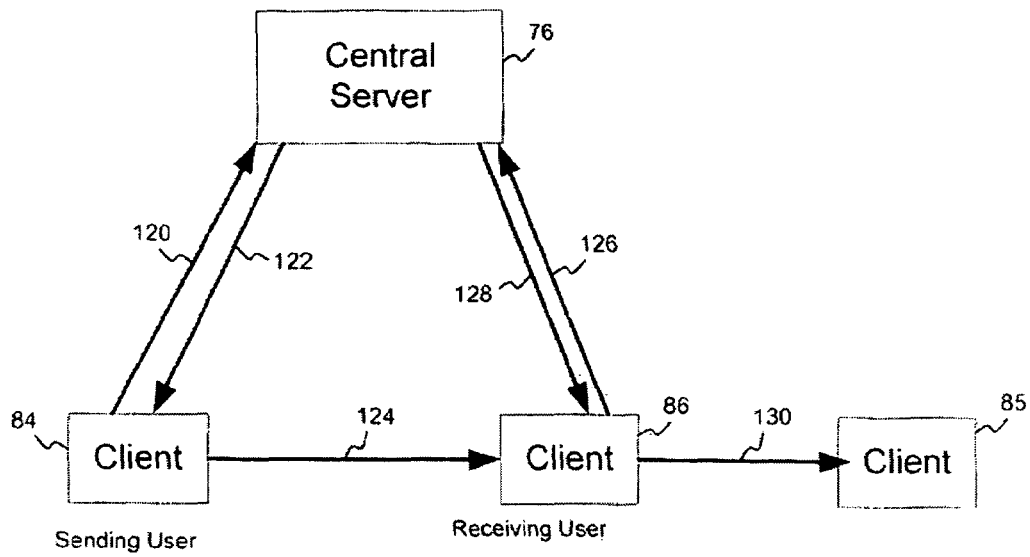
FIG. 6 provides a block diagram with content flow representation for a system and method in which a social network may be both proactively and reactively optimized.

FIGS. 4-6, respectively, will now be discussed with reference to different manners in which social network optimization steps or features may be initiated in a social network. More particularly, a social network can be optimized proactively or reactively. For example, in systems using controlled viral content distribution such as discussed with reference to FIG. 1, the level and associated content is determined by a sending user. By utilizing the methods described here and as illustrated in FIG. 4, a sending user 84 could request the optimized social network prior to content distribution. In the example of FIG. 4, in which social network optimization is requested proactively by sending user 84, user 84 may initially send via path 88 a request for optimization. The request may include general distribution parameters, such as but not limited to content metadata, owner identification, and an initial distribution list. Central server 76 may then send to sending user 84 via path 90 a distribution list with optimized user levels. Content that is optimized for a given receiving user 86 may then be sent via path 92 to a receiving user 86.

Although only one optimized distribution path is illustrated in FIG. 4 (as well as in FIGS. 5 and 6), it should be appreciated that many other optimized distributions may be sent once central server 76 sends sending user 84 the optimized levels or distribution lists at path 90. Also, it should be appreciated that the "paths" illustrated as arrowed lines in FIGS. 4-6 are intended to represent steps in an optimization process, and not necessarily a one-directional communication link among client and server components in the network. Actual communication links may be direct or indirect among communication nodes and will often be bi-directional in nature.

In an alternative embodiment, such as illustrated in FIG. 5, the system can provide an optimized level in the social network reactively. In this exemplary scenario, a sending user sends original content to a receiving user via path 94. The receiving user then requests a version of the content that utilizes the optimized social network. The receiving user 86 sends a message to the central server 76 via path 96 requesting an optimized version of the content. The central server 76 then calculates the optimal social network. If the receiving user's level in the optimized social network has improved, central server 76 then sends a message via path 98 to the originating client 84 to redistribute the content to the user according to the new level. If desired, originating client 84 may then send an optimized version of the digital content to receiving user 86 via path 94.

In a still further alternate embodiment of the disclosed social network optimization technology, the two approaches described above with reference to FIGS. 4 and 5 are combined such that the optimized social network is packaged and distributed along with the original content. Thus, an agent running on the client can utilize the optimized social network to automatically determine the appropriate level for downstream users. This method may be useful in instances where content has become "stale" relative to the optimization in the social network. In other words, if there is a lot of activity in the social network, the distributed social network may become out of date. This system still has the ability to utilize the reactive method and obtain the most up to date version of the optimized social network. Furthermore, when a receiving client requests an up to date social network, that new version will be packaged with the content for further distribution.

More particular discussion of a combined proactive and retroactive optimization process will now be presented with reference to FIG. 6. Before distributing content in a social network, sending user 84 can request an optimized social network from central server 76 via path 120. The optimized network (or optimized parameters such as user levels, distribution lists, or others) is sent back to the originating user 84 via path 122 and content packaged with the optimized network is then sent via path 124 to a receiving user 86. Further social network optimization updates may be received by user 86 from central server 76 via path 126. If additional updates are available (e.g., when high levels of content distribution activity render the original optimization as outdated), then the new optimization parameters are returned to receiving user 86 at path 128. Content packaged with updated optimization parameters may then be sent to another receiving user 85 via path 130.

Figure 7:
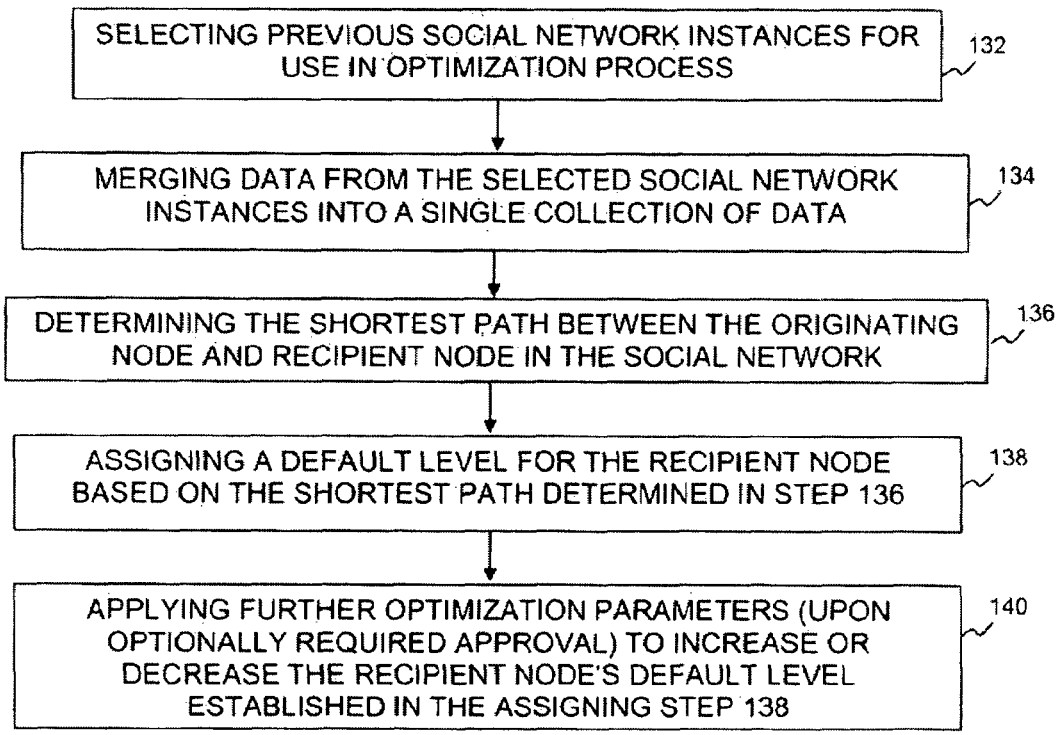
FIG. 7 provides a block diagram representation of exemplary steps in a method for optimizing a social network and associated user's network level.

Referring now to FIG. 7, exemplary steps in a process for the optimization of a user's level in a current social network instance will now be described. A first exemplary step 132 involves selecting previous social network instances for use in the optimization process. Several factors may be used to make the determination of which prior instances to select. A user has the ability to tune these parameters which will affect how much (if at all) each factor will influence the optimization process. Exemplary influencing factors that may be selectively employed by a user include without limitation: the scope of network interactions, the geographic origins of users or content, the type of distributed content, the age of previous social network instances, the amount of content consumption, and other static social network definitions. These factors may collectively function together to determine which social network instances are used to determine the optimal social network. Such factors or others may also be applied sequentially as separate queries using the results of the preceding query or as one combined query. All such options may be provided as default settings or may be selected and tuned by the originating user. The exemplary influencing factors listed above will now be discussed in further detail. It should be appreciated that these are provided as mere examples, and other factors may additionally or alternatively utilized with the presently disclosed optimization technology.

A first exemplary influencing factor that may be used in step 132 of selecting previous social network instances is the scope of network interactions. In one example, a user selects how much weight to give prior scope of interactions by selecting from a plurality of scope examples. Examples of potential prior interactions are illustrated in the following table, ranging downward from broadest to narrowest scope.

| SCOPE: | DESCRIPTION: |
|---|---|
| All | All instances are used as the initial set for the optimized social network. |
| Includes Me | Any instance where the current user is anywhere in the social network. |
| Initiated by Me | Any instance where the current user initiated the instance. |

Another possible selection parameter related to the above scope of network interactions is a parameter involving the geographic origins of users or content associated with one or more social network instances. When users communicate via systems outfitted with location-based services, such as GPS-enabled mobile devices or other devices or systems, metadata associated with communication links or distributed content can include geographical identifiers. This enables a user selecting previous social network instances to request, for example, social network instances involving selected users within a given geographic area (e.g., a 100-mile radius, a given quadrant area, a given state, county, city or other defined boundary area or areas).

Another selection parameter that may be employed in step 132 of selecting previous social network instances relates to content metadata. As the content is distributed it can be classified by genre, rating, ontology or any other means of classification. The resulting classification(s) may be stored with the social network instance created by the distribution. Now, when the user distributes similar content, the system can find the social network instances with a matching classification. When desired, only these selected social network instances are used to optimize the current social network. The content metadata will be applied differently based on the underlying system usage. For example, when utilized with IM based circuits, this parameter could be referred to as "Topic". Other descriptive parameters than content type and underlying system usage may be defined by a user and selectively used to choose prior social network instances for use in the subject optimization process.

Yet another selection parameter corresponds to the age of previous social network instances. The elapsed time between the current time and previous social network instances can have an influence on if and how that instance is included in the optimization. For example, the user may specify to only include previous social network instances that are less than six months old, or some other default or predetermined time period.

Another selection parameter may relate to the amount of consumption associated with users or content of prior distributions or communications. For example, consider a digital video that is shared among multiple users in a social network. Some users will actually view the shared video and some will not. Some users may view a portion of the video and others may view it in its entirety. Consumption can be defined in terms of mere access or the actual amount of access. Based on this description of consumption associated with prior distributions or communications, users may desire to select prior social network instances involving users that actually accessed some predetermined portion of shared content (in all applicable forms including video, audio, graphic and other forms) or instances where content was consumed in some preselected fashion.

A still further selection parameter for choosing previous social network instances corresponds to static social network definitions. External or internal static social network definitions, such as FOAF networks, can be utilized in the optimization. For example, the user may choose to optimize the current social network against his social network from LinkedIn or from MySpace, or other static social network group.

Referring again to FIG. 7, a second exemplary step 134 in a method of optimizing a social network corresponds to merging data from the social network instances selected in step 132 into a single collection of data. Merging social network instances is essentially an academic progress of eliminating redundant nodes in a combined network while preserving all possible communication paths. An example of this merging step was illustrated in FIG. 2 where prior distribution instances 70 and 72 are merged into a single collection of data represented by social network 74. Specific procedures for combining such information are known and understood by those of skill in the art, and so additional specific discussion regarding such combinations is not presented herein. It should be appreciated that although the data merged in step 134 is referred to herein as a single collection of data, such single collection may actually comprise an assemblage of distinct sub-groups of data.

Referring still to FIG. 7, another exemplary step 136 in the subject optimization process involves determining the shortest path between an originating node and a requesting recipient node in the social network. Step 136 may be performed by an optimization server (e.g., servers 76 and/or 78 of FIG. 3). Finding the shortest path can be done in a number of different ways, all known to one of skill in the art. One of many examples for such a shortest path determination involves Dijkstra's algorithm, an algorithm that solves the single-source shortest path problem for a directed graph with non-negative edge weights.

As an example, consider the sample use case previously discussed with reference to FIG. 2. Assume that the data merged in step 134 included prior distribution instances 70 and 72. When the shortest path is determined in step 136 for this collection of data, an optimization server would select the two-level path of distribution 70 (as opposed to the path spanning five levels in distribution 72) as the shortest path.

The optimization server may use the shortest path determined in step 136 from the merged social network to assign in step 138 a baseline or default level for that user in the social network. The default level may correspond exactly to the level distance of the determined shortest path or may be correlated based on a default or user-selectable mapping function from shortest path to default level. The default level may then optionally be adjusted up or down in step 140 by applying additional optimization parameters as will now be discussed. Users that initiate social network instances have the ability to set various parameters that control if and how receiving users can increase their level in the social network. By utilizing the factors below the user is able to move a user either up or down in the social network. For each factor, a level-modification range may be provided. This allows the user to determine how much, if at all, a given factor may influence a user's level in the network. For example, the user can specify that the distribution history factor has a range from +2 to −2 meaning that a user can be increased or decreased a maximum of two levels.

With further regard to additional optimization parameters applied in optional exemplary step 140, user-based controls may be used to designate whether increasing or decreasing a user's determined optimized default level in the social network is allowed for a given user or set of users. Approval may be required by a content owner before additional optimization parameters are employed that increase or decrease a user's optimized level. When approval is required, the approval can either be manual or automated by the system based on further rules. The following table provides some sample restriction definitions. These examples refer to a typical social network in which "increasing levels" means you are getting closer to the content originator.

| User(s) | Restriction | Approval Required |
|---|---|---|
| Joe, Abby | Maximum level increase: 1 | ✓ |
| Users classified as Sci-Fi | Closest level: 3 | N/A |
| Shannon | Maximum level increase for "Home" content: 1 | ✓ |

Figure 8:
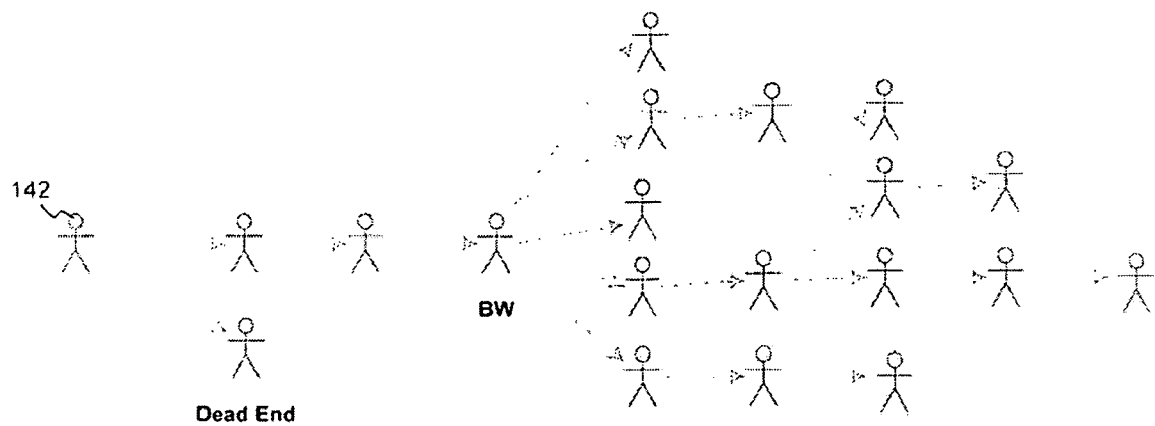
FIG. 8 provides an exemplary social network instance in which initial content recipients have differing levels for which they further distribute shared content.

An additional factor that may be used to influence a particular user's optimized level in the social network is distribution history. This factor may be utilized to indicate who in a social network is really providing the bulk of viral distribution. Such a user is often referred to as the bellwether. FIG. 8 depicts a network distribution situation where a bellwether type user (BW) could be rewarded by increasing his level in the network. Based on the configuration of FIG. 8, BW user would be assigned a default level access of three since BW is three levels of separation from originating node 142. However, because of BW's value in the overall social network by significantly advancing distribution of content relative to other paths, BW's level could be increased to two (or some other selected increased level). In contrasting situations, a user could be penalized (moved down one or more levels) if he never distributes the content further. For example, the user Dead End could be penalized for acting as a content leech and not advancing the distribution of content.

User classification is another factor that can be used to increase/decrease a user's level in the network based on how "like" that user is to the originating user. Parameter similarities, or user "likenesses" could be determined by a number of means including interests, demographics, income, etc. For example, someone's position in the current social network can be increased or decreased depending on how similar that user's favorite movie genre is to the originator.

A still further feature that may be used in exemplary social network optimization embodiments involves a throttling mechanism which is used to prevent users making large jumps in the current social network. For example, in the baseline use case illustrated in FIG. 2, user James jumped from a level five user to a level two user due to the previous content distribution 70. Using a throttling factor, the user may be restricted to increasing only a given number of levels for a single distribution. For example, if users in FIG. 2 are limited to increasing or decreasing a maximum of two levels for a single distribution, then user James would have been set to a level three instead of level two. The throttling factor may be a default setting or a parameter set by the originating owner of the content. The factor could be a "maximum levels to increase" as described above, as a "maximum percentage increase", or some other measure.

When the subject social network optimization system is applying a throttling mechanism, or otherwise explicitly setting the level of a user, it may be forming paths in the social network that are not based on prior social network instances. As such, the system treats these nodes and paths differently. These are referred to herein as "system generated nodes and paths". Based on the example given above with regards to a throttling mechanism as applied to the distribution of FIG. 2, James is set to a level three for the current content. Using system generated nodes and paths, the resulting optimized social network may be illustrated as pictured in FIG. 9, in which the new optimized path between users Vicky and James is via a system node as opposed to a prior established path.

It should be appreciated that additional or alternative factors for optimizing user levels may be employed for use with the present optimization technology than the ones described above. It should also be appreciated that in addition to optimizing a user's level in the current social network, optimized social networks as described in this disclosure could be used in other exemplary ways, including for enhanced audit/history reporting and as a recommendation tool for future distributions.

Figure 9:
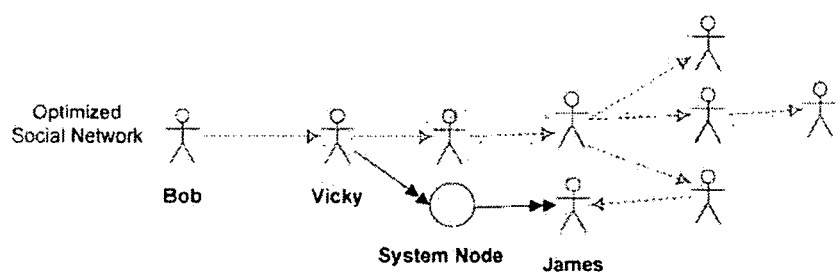
FIG. 9 provides an exemplary optimized social network with paths based on prior social network instances as well as system generated nodes and paths.

In accordance with an enhanced audit/history reporting feature, the same parameters mentioned above may be selectively used as input criteria by which users would be able to analyze their social network for past content distributions. For example, a user could request information defining the optimized social network for all political videos that user has sent out in the past three months". A social network graph with schematically linked users, such as shown in FIGS. 8 and 9 can be displayed, or any number of other alternative visual representations may be provided. Such historical representations serve as a social network based summary of where and how content has previously been distributed. Relationships on the graph or other visual representation could indicate how often the path was traversed. This could be indicated, for example, either by changing the color on certain thresholds, or as a text based label of the actual count.

In accordance with a recommendation tool for future distributions, the disclosed social network optimization system could be used to recommend who content should be distributed to for future distributions. For example, an optimized social network for a particular type of content may indicate that sending it to User X never results in much activity, but sending it to User Y results in a large social network. Based on such a determination, a content originator may define a future distribution list to include User Y and similar users, but not User X. Also, a content owner could make a query to the optimization server that requests delivery to all users within a certain optimized level range, for instance to all level one and level two users in the optimized social network.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention.

What is claimed is:

1. A method for determining access rights of a node in a social network having a plurality of nodes, comprising:

for each of a plurality of first distributions of content among the plurality of nodes, generating a content path record identifying a nodal path of the content from an originating node through a plurality of recipient nodes;

storing each content path record in a memory;

receiving a request for a level indicator associated with one of the plurality of nodes during a second distribution of content;

identifying an originating node of the second distribution of content;

retrieving at least one content path record wherein:
the originating node of the second distribution of content is the same originating node as the originating node identified in the at least one content path record; and
the one of the plurality of nodes is the same as one recipient node of the plurality of recipient nodes identified in the at least one content path record;

calculating a number of recipient nodes in the nodal path identified in the at least one content path record between the originating node identified in the at least one content path record and the one of the plurality of recipient nodes identified in the at least one content path record;

determining the level indicator based on the number of recipient nodes in the nodal path; and sending the level indicator in response to the request.

2. The method of claim 1 wherein retrieving the at least one content path record comprises retrieving a plurality of content path records wherein for each of the plurality of content path records:
the originating node of the second distribution of content is the same originating node as the originating node identified in the content path record; and
the one of the plurality of nodes is the same as one recipient node of the plurality of recipient nodes identified in the content path record,
wherein calculating the number of recipient nodes in the nodal path identified in the at least one content path record between the originating node identified in the at least one content path record and the one of the plurality of nodes further comprises calculating the number of recipient nodes in the nodal path identified in the content path record between the originating node identified in the at least one content path record and the one of the plurality of nodes for each of the plurality of content path records, and wherein determining the level indicator based on the number of recipient nodes in the nodal path comprises determining the level indicator based on a lowest number of recipient nodes calculated for the plurality of content path records.

3. The method of claim 1 further comprising receiving the level indicator, and providing access to one of a plurality of different versions of content based on the level indicator.

4. The method of claim 1 further comprising receiving the level indicator, selecting one of a plurality of different versions of content based on the level indicator, and sending the one of the plurality of different versions of content to the one of the plurality of nodes.

5. The method of claim 1 wherein the request for the level indicator is received from the one of the plurality of nodes.

6. The method of claim 1 wherein the request for the level indicator is received from a node immediately preceding the one of the plurality of nodes in the nodal path of the second distribution of content.

7. The method of claim 1 further comprising determining if the level indicator is greater than a maximum level indicator, and if so, setting the level indicator to the maximum level indicator.

8. A computer for determining access rights of a node in a social network having a plurality of nodes, the computer adapted to:
for each of a plurality of first distributions of content among the plurality of nodes, generate a content path record identifying a nodal path of the content from an originating node through a plurality of recipient nodes;

store each content path record in a memory;

receive a request for a level indicator associated with one of the plurality of nodes during a second distribution of content;

identify an originating node of the second distribution of content;

retrieve at least one content path record wherein:
the originating node of the second distribution of content is the same originating node as the originating node identified in the at least one content path record; and
the one of the plurality of nodes is the same as one recipient node of the plurality of recipient nodes identified in the at least one content path record;

calculate a number of recipient nodes in the nodal path identified in the at least one content path record between the originating node and the one of the plurality of recipient nodes identified in the at least one content path record;

determine the level indicator based on the number of recipient nodes in the nodal path; and send the level indicator in response to the request.

9. The computer of claim 8 wherein to retrieve the at least one content path record the computer is further adapted to retrieve a plurality of content path records wherein for each of the plurality of content path records:
the originating node of the second distribution of content is the same originating node as the originating node identified in the content path record; and
the one of the plurality of nodes is the same as one recipient node of the plurality of recipient nodes identified in the content path record,
wherein to calculate the number of recipient nodes in the nodal path identified in the at least one content path record between the originating node identified in the at least one content path record and the one of the plurality of nodes the computer is further adapted to calculate the number of recipient nodes in the nodal path identified in the content path record between the originating node identified in the at least one content path record and the one of the plurality of nodes for each of the plurality of content path records, and wherein to determine the level indicator based on the number of recipient nodes in the nodal path the computer is further adapted to determine the level indicator based on a lowest number of recipient nodes calculated for the plurality of content path records.

10. The computer of claim 8 wherein the request for the level indicator is received from the one of the plurality of nodes.

11. The computer of claim 8 wherein the request for the level indicator is received from a node immediately preceding the one of the plurality of nodes in the nodal path of the second distribution of content.

12. The computer method of claim 8 wherein the computer is further adapted to determine if the level indicator is greater than a maximum level indicator, and if so, setting the level indicator to the maximum level indicator.

13. A computer program product comprising a computer usable storage medium having a computer readable program code embodied therein, the computer readable program code adapted to be executed on a processor implementing a method for determining access rights of a node in a social network having a plurality of nodes, comprising:

for each of a plurality of first distributions of content among the plurality of nodes, generating a content path record identifying a nodal path of the content from an originating node through a plurality of recipient nodes;

storing each content path record in a memory;

receiving a request for a level indicator associated with one of the plurality of nodes during a second distribution of content;

identifying an originating node of the second distribution of content;

retrieving at least one content path record wherein:
the originating node of the second distribution of content is the same originating node as the originating node identified in the at least one content path record; and
the one of the plurality of nodes is the same as one recipient node of the plurality of recipient nodes identified in the at least one content path record;

calculating a number of recipient nodes in the nodal path identified in the at least one content path record between the originating node identified in the at least one content path record and the one of the plurality of recipient nodes identified in the at least one content path record;

determining the level indicator based on the number of recipient nodes in the nodal path; and sending the level indicator in response to the request.

14. The computer program product of claim 13 wherein retrieving the at least one content path record comprises retrieving a plurality of content path records wherein for each of the plurality of content path records:

the originating node of the second distribution of content is the same originating node as the originating node identified in the content path record; and the one of the plurality of nodes is the same as one recipient node of the plurality of recipient nodes identified in the content path record, wherein calculating the number of recipient nodes in the nodal path identified in the at least one content path record between the originating node identified in the at least one content path record and the one of the plurality of nodes further comprises calculating the number of recipient nodes in the nodal path identified in the content path record between the originating node identified in the at least one content path record and the one of the plurality of nodes for each of the plurality of content path records, and wherein determining the level indicator based on the number of recipient nodes in the nodal path comprises determining the level indicator based on a lowest number of recipient nodes calculated for the plurality of content path records.

15. The computer program product of claim 13 further comprising receiving the level indicator, and providing access to one of a plurality of different versions of content based on the level indicator.

16. The computer program product of claim 13 further comprising receiving the level indicator, selecting one of a plurality of different versions of content based on the level indicator, and sending the one of the plurality of different versions of content to the one of the plurality of nodes.

17. The computer program product of claim 13 wherein the request for the level indicator is received from the one of the plurality of nodes.

18. The computer program product of claim 13 wherein the request for the level indicator is received from a node immediately preceding the one of the plurality of nodes in the nodal path of the second distribution of content.

19. The computer program product of claim 13 further comprising determining if the level indicator is greater than a maximum level indicator, and if so, setting the level indicator to the maximum level indicator.

* * * * *